(12) United States Patent
Maatouk et al.

(10) Patent No.: US 10,704,393 B2
(45) Date of Patent: Jul. 7, 2020

(54) CONTOURING OF AN AIRFOIL ARRAY PLATFORM

(71) Applicant: MTU Aero Engines AG, Munich (DE)

(72) Inventors: Fadi Maatouk, Munich (DE); Markus Brettschneider, Karlsfeld (DE); Inga Mahle, Munich (DE)

(73) Assignee: MTU Aero Engines AG, Munich (DE)

( * ) Notice: Subject to any disclaimer, the term of this patent is extended or adjusted under 35 U.S.C. 154(b) by 127 days.

(21) Appl. No.: 15/974,813

(22) Filed: May 9, 2018

(65) Prior Publication Data

US 2018/0328185 A1 Nov. 15, 2018

(30) Foreign Application Priority Data

May 10, 2017 (EP) ..................... 17170495

(51) Int. Cl.
*F01D 5/14* (2006.01)
*F01D 9/04* (2006.01)

(52) U.S. Cl.
CPC ............. *F01D 5/145* (2013.01); *F01D 5/143* (2013.01); *F01D 9/04* (2013.01); *F01D 9/041* (2013.01); *F05D 2220/323* (2013.01); *F05D 2240/11* (2013.01); *F05D 2240/80* (2013.01)

(58) Field of Classification Search
CPC ....... F01D 5/143; F01D 5/145; F05D 2270/17
See application file for complete search history.

(56) References Cited

U.S. PATENT DOCUMENTS

| 19,215,362 | | 10/2008 | Harvey et al. | |
| 8,511,978 | B2 * | 8/2013 | Allen-Bradley | ........ F01D 5/145 |
| | | | | 415/191 |
| 8,985,957 | B2 | 3/2015 | Mahle et al. | |
| 9,453,415 | B2 | 9/2016 | Engel | |
| 9,470,094 | B2 | 10/2016 | Mahle et al. | |
| 9,551,226 | B2 * | 1/2017 | Smith | ...................... F01D 5/143 |
| 2007/0258818 | A1 | 11/2007 | Allen-Bradley et al. | |

(Continued)

FOREIGN PATENT DOCUMENTS

| EP | 1 967 694 A2 | 9/2008 |
| EP | 2631429 | 8/2013 |

(Continued)

*Primary Examiner* — Richard A. Edgar
*Assistant Examiner* — Michael K. Reitz
(74) *Attorney, Agent, or Firm* — Davidson, Davidson & Kappel, LLC

(57) ABSTRACT

Disclosed is an airfoil array segment (110, 120, 130, 140, 150) of an airfoil array for a turbomachine, the airfoil array segment including a platform (10) having a platform surface, as well as at least two airfoils (20, 30). The platform surface has a depression (111, 121, 131, 141, 151) which extends up to the first airfoil and contacts the pressure side (21) of the first airfoil downstream of 80% of the axial chord (g) downstream of the leading edges (23, 33) and which contacts the pressure side (21) of the first airfoil downstream up to no more than 80% of the axial chord (g) downstream of the leading edges (23, 33). At least one lowest point (112, 122) of the depression is located at least 90% of the axial chord (g) downstream of the leading edges (23, 33). Also disclosed are an airfoil array, an airfoil passage, a platform, a turbomachine, and an aircraft engine.

15 Claims, 3 Drawing Sheets

(56) References Cited

U.S. PATENT DOCUMENTS

2014/0169977 A1* 6/2014 Brettschneider ........ F01D 5/143
  416/223 A
2014/0348661 A1 11/2014 Mahle et al.
2017/0089203 A1* 3/2017 Lohaus .................... F01D 5/14

FOREIGN PATENT DOCUMENTS

| EP | 2 487 329 B1 | 11/2013 |
| EP | 2746533 | 6/2014 |
| EP | 2 787 172 A2 | 10/2014 |
| EP | 2806103 | 11/2014 |
| EP | 2 696 029 B1 | 10/2015 |

* cited by examiner

CONTOURING OF AN AIRFOIL ARRAY PLATFORM

This claims the benefit of European Patent Application EP 17170495.0, filed May 10, 2017 and hereby incorporated by reference herein.

The present invention relates to an airfoil array segment, an airfoil array, a platform, and an airfoil passage of a turbomachine, and to a turbomachine and an aircraft engine.

BACKGROUND

Turbomachines (such as gas and steam turbines) always have a flow duct for passage of a fluid therethrough. The flow duct, also referred to as "annular space," is radially inwardly bounded by the shaft of a rotor and radially outwardly by a casing. As used herein, and unless otherwise stated, the terms "radial," "axial," and "circumferential direction," as well as terms derived therefrom, are taken with respect to an axis of rotation of the rotor.

A turbomachine has airfoil arrays (commonly also referred to as "blade rings" and "vane rings) arranged in its annular space. The airfoil arrays include stator vanes or rotor blades which are arranged in succession and substantially equally spaced in the circumferential direction, as well as associated platforms, which are also referred to as "shrouds" and generally have a leading platform edge and a trailing platform edge. These platform edges delimit the platform surface in the axial direction. The term "platform surface" as used herein refers to the surface of the platform that faces the blades or vanes (i.e., the airfoils).

The platform edge that is first passed over by the (axial) primary flow that, during operation, is directed through the annular space of the turbomachine, is referred to herein as "leading" platform edge; the opposite edge is accordingly referred to as "trailing" platform edge. Correspondingly, the terms "downstream" and "upstream" refer to the axial primary flow direction, and, more specifically, only to the axial position, regardless of any possible offset in the circumferential or radial direction. Specifically, a point is understood herein as being located "downstream of the leading edges" (or as being located "downstream of another point"), if, relative to a direct connection between the leading edges (to one another) (or relative to another point), it is axially offset in the direction of (i.e., following) the primary flow. This applies analogously to the term "upstream" (in the opposite direction).

The section of the platform surface that is axially bounded by the direct connections between the leading and trailing edges of adjacent airfoils at the platform surface (i.e., the connections extending in the circumferential direction without deviating axially therefrom) and circumferentially by the pressure side of one airfoil and the suction side of the other airfoil is referred herein as "inter-airfoil strip." The width of the inter-airfoil strip in the circumferential direction at the leading edges is referred to as "pitch spacing" (of the airfoil array or of an airfoil array segment or of the airfoils). Specifically, the pitch spacing may be measured as the circumferential spacing between the leading edges of adjacent airfoils in the area of the platform surface. The spacing between the leading and trailing edges of the airfoils measured (solely) in the direction of the designated axial primary flow is referred to as the "axial chord length" or "axial chord."

The pressure side of one airfoil and the suction side of an adjacent airfoil each circumferentially bound what is generally referred to as an airfoil passage. Within the turbomachine, this airfoil passage is radially bounded by what is known as endwalls. These endwalls are formed, on the one hand, by the platforms and, on the other hand, by sections located radially opposite these platforms. In the case of rotor blades, such an opposite endwall is a radially outer section (such as a section of an outer shroud of the rotor blade(s); in the case of stator vanes, it is a radially inner section (such as a radially inner platform of the stator vane(s) or a wall of another stator in the region of the hub).

A fluid flow passing through a flow duct is always affected by the surfaces of the endwalls. Due to their lower velocity, flow layers near these surfaces are deflected to a greater degree than flow layers which are further away from the endwalls. Thus, a secondary flow is formed which is superimposed on an axial primary flow and leads, in particular, to vortices and pressure losses.

To reduce secondary flows, often, contours in the form of elevations and/or depressions are formed in the endwalls.

A variety of such contours, commonly known as "endwall contours," are known from the prior art.

European Patent Publication EP 1 967 694 A2, for example, shows an elevation in an endwall contour for a turbomachine where an airfoil is on one side partially rooted to the elevation (i.e., a portion of a boundary line between the endwall and the airfoil runs on the elevation).

U.S. Pat. No. 8,511,978 B2 describes an endwall contour where a platform between two airfoils has a depression that is located at least 30% of the axial chord downstream of the leading edges of the airfoils.

The Applicant's patents or patent applications EP 2 487 329 B1, EP 2 787 172 A2, and EP 2 696 029 B1 should also be mentioned by way of example.

SUMMARY OF THE INVENTION

It is an object of the present invention to provide a technique that facilitates reducing secondary flows in the annular space of a turbine in an advantageous manner.

An airfoil array segment according to the present invention is a segment of an airfoil array for a turbomachine, such as a low-pressure turbine. The airfoil array segment includes a platform having a platform surface, as well as at least two airfoils. Lying on the platform surface between the pressure side of a first one and the suction side of the second one of the airfoils is an inter-airfoil strip whose axial chord length is defined by the leading and trailing edges of the airfoils. The platform surface has a depression that extends up to, and thus contacts, the first airfoil (i.e., its pressure side and/or trailing edge). Thus, a portion of a boundary line between the first airfoil and the platform surface may coincide with a portion of a zero-elevation contour line bounding the depression (so that the edge of the depression contacts the first airfoil), or the boundary line may partly extend in the depression. The last-mentioned situation, in which the boundary line has a contour that is defined by the depression is described herein also as a portion of the airfoil "being rooted" in the depression. In advantageous embodiments of the present invention, the first airfoil may be rooted in the depression on its pressure side and/or at its trailing edge.

The term "depression" is used herein to refer to a local formation (such as a trough or recess) in the platform surface, in which it extends radially toward the side facing away from the airfoils. Analogously, the term "elevation" is understood (e.g., further below) to mean a local formation (such as a hump or protrusion) in the platform surface in the opposite direction (i.e. toward the side facing the airfoils).

Thus, the terms "depression" and "elevation" (as well as terms such as "depth," "height," and the like) are based here on an orientation or a coordinate system where the airfoils and an elevation extend "upwardly" from the platform surface and a depression correspondingly extends in the opposite direction ("downwardly"). In particular, therefore, the airfoil passage is considered to be located "above" the platform surface.

The depression in the platform surface of an airfoil array segment according to the present invention contacts the pressure side of the first airfoil downstream of 80% of the axial chord downstream of the leading edges; i.e., in a contact region located in the downstream-most fifth of the inter-airfoil strip. The depression contacts the pressure side of the first airfoil up to no more than 80% of the axial chord downstream of the leading edges; i.e., when viewed from the aforementioned contact region (or from the trailing edges) in the upstream direction, not beyond an upstream boundary of the downstream-most fifth of the inter-airfoil strip, but only in the aforementioned downstream-most fifth of the inter-airfoil strip.

In a specific embodiment that has proven to be advantageous, the depression is located entirely downstream of 80% of the axial chord downstream of the leading edges; i.e., all points thereof are located downstream of an upstream boundary of the downstream-most fifth of the inter-airfoil strip.

The depression in the platform surface of an airfoil array segment according to the present invention further has a lowest point that is located at least 90% of the axial chord downstream of the leading edges of the airfoils.

"Lowest points" are understood herein to be the points of the respective depressions at which the respective depressions extend radially furthest away from a side at which an endwall opposite the platform is, or is to be, disposed, so that an associated airfoil passage is locally maximally enlarged at a lowest point of the depression.

Analogously (further below), a "highest point" of an elevation is a point at which the elevation (compared to the other points thereof) extends closest to the side at which an endwall opposite the platform is, or is to be, disposed, so that an associated airfoil passage is locally maximally narrowed there.

A plurality of highest points and a plurality of lowest points may each form a respective surface section or curve (e.g., if an associated elevation forms a plateau or a crest or ridge; this applies analogously to a depression, e.g., if it forms a groove, a trench or a basin, respectively), or a highest or lowest point may be singular.

In a specific exemplary embodiment, the depression has exactly one lowest point.

The platform surface may in particular form a curve or a surface section which extends upstream of the depression (preferably no more than 20% of the axial chord upstream of the trailing edges) from the pressure side of the first airfoil to the suction side of the second airfoil and which forms a zero-elevation contour line or an (uncontoured) zero-elevation surface in the sense that a depression is located radially below (and, if present, an elevation is located radially above) the zero-elevation contour line or zero-elevation surface, respectively. As mentioned above, an airfoil passage is considered to be located "above" the platform surface. Such a zero-elevation surface may in particular include a sub-strip of the inter-airfoil strip, whose upstream boundary extends at 20% axial chord upstream of the trailing edge in the circumferential direction (without deviating axially therefrom) from the first airfoil to the second airfoil. Analogously, a downstream boundary of such a sub-strip may extend at all points at 15% or even only 10% of the axial chord upstream of the trailing edges in the circumferential direction from the first airfoil to the second airfoil (so that (measured in the axial primary flow direction) the sub-strip has a continuous width of 5% or even 10% of the axial chord).

An airfoil array segment according to the present invention may be a single piece or an assembly. In particular, the platform may be a single piece or include two or more parts, each having an airfoil extending therefrom, or the platform may be configured as a separate component which is, or can be, disposed between the airfoils. Accordingly, a platform according to the present invention is adapted to adjoin an airfoil on each side in the circumferential direction and to form, together with the airfoils (of which none, exactly one or both may be permanently formed on the platform integrally therewith), an inventive airfoil array segment according to any of the embodiments disclosed herein.

An airfoil array according to the present invention includes at least one inventive airfoil array segment according to any of the embodiments disclosed herein.

An airfoil passage according to the present invention extends through an inventive airfoil array segment according to any of the embodiments disclosed herein; i.e., is bounded by such an airfoil array segment and an endwall located opposite the platform thereof (facing the platform surface). In the circumferential direction, the airfoil passage is bounded by the pressure side of the first airfoil and the opposite suction side of the (adjacent) second airfoil.

The airfoil array segment, the airfoil array, the airfoil passage and the platform may, in particular, form part of a low-pressure turbine or adapted to be installed and used in a low-pressure turbine. The airfoils may be stator vanes or rotor blades. The platform may be adapted to radially inwardly or radially outwardly bound the airfoil passage through the airfoil array segment.

A turbomachine according to the present invention includes one or more airfoil arrays according to the present invention. Such an airfoil array may in particular be disposed in the area of a low-pressure turbine of the turbomachine.

An aircraft engine according to the present invention includes a turbomachine according to the present invention.

Due to the inventive geometry of the platform surface, an inventive airfoil array segment, an inventive airfoil array, an inventive airfoil passage, an inventive platform, an inventive turbomachine, and an inventive aircraft engine influence the static pressure field at the platform surface and the airfoils in the edge region. Secondary flow, especially vortices in the airfoil passage may be thereby reduced. This makes it possible to reduce losses and improve the flow into a possible further airfoil located downstream.

The at least one lowest point of the depression may be located on a boundary line between the platform surface and the pressure side of the first airfoil or at the trailing edge thereof.

In a variant embodiment that has proven to be advantageous, the depression extends downstream beyond the inter-airfoil strip; i.e., has a portion located downstream of the trailing edges of the airfoils. This portion may include at least one lowest point of the depression and/or a lowest point of the depression may lie on a downstream boundary of the inter-airfoil strip; i.e., on a connection between the trailing edges of the airfoils that extends along the platform surface directly in the circumferential direction (without deviating axially therefrom).

In an airfoil array segment of advantageous specific embodiment, the depression extends no more than 60% or no more than 50% of a pitch spacing of the airfoil array segment from the first airfoil in the circumferential direction.

In an advantageous variant embodiment of the present invention, the platform surface has at least one elevation in addition to the depression. This advantageously makes it possible to further reduce flow losses. Preferably, such an elevation is entirely or partially located upstream of the depression (e.g., even upstream of an (uncontoured) zero-elevation surface which, as described above, may extend upstream of the depression from the first airfoil to the second airfoil.

Preferably, the elevation may extend up to, and thus contact, the first airfoil. A boundary line between the platform surface and the pressure side of the first airfoil may thus have a portion that coincides with a portion of a zero-elevation contour line bounding the elevation and/or a portion of the first airfoil may be rooted on its suction side to the elevation. In accordance with the terminology used herein, this means that the boundary line between the platform surface and the airfoil runs over the elevation (in this portion); i.e., has a contour defined by the elevation.

A variant embodiment that has proven to be advantageous is one where at least one highest point of the elevation is spaced from the pressure side of the first airfoil by a distance (measured in the circumferential direction) of no more than 10% or even no more than 5% of the pitch spacing, or where a highest point of the elevation even lies on a boundary line between the first airfoil and the platform surface.

In a preferred specific embodiment of the present invention, the depression is a first depression and the platform surface has at least one second depression which is entirely or partially located upstream of the first depression. Specifically, the second depression may be located at all points at least 20% of the axial chord upstream of the trailing edges of the airfoils. Preferably, the second depression extends up to the suction side of the second airfoil.

In a particular variant embodiment that has proven to be advantageous, a portion of the second airfoil is rooted on its suction side in the second depression of the platform surface.

At least one lowest point of the second depression is preferably spaced from the suction side of the second airfoil by at a distance (measured in the circumferential direction) of no more than 10% or even no more than 5% of the pitch spacing, or a lowest even lies on a boundary line between the second airfoil and the platform surface.

Preferably, a second depression extends circumferentially no more than 60% or even no more than 50% of the pitch spacing from the suction side of the second airfoil into the inter-airfoil strip. The second depression may, for example, be partially bounded by a zero-elevation contour line (or even a zero-elevation surface) extending from a first position on the suction side of the second airfoil to a second position on the suction side, so that the second depression is thus enclosed between the suction side and the zero-elevation contour line (or zero-elevation surface).

In an advantageous embodiment, the platform surface has a first and a second depression as well as an elevation having one or more of the features mentioned herein. A distance between a highest point of the elevation and a lowest point of the second depression (measured solely in the axial primary flow direction) may be less than 15% or even less than 10% of the axial chord length, or a highest point of the elevation and a lowest point of the second depression may even be located substantially the same distance downstream from the leading edges of the airfoils. The elevation may contact the depression at one point or in a region (or merge into the second depression), or the platform surface may form a zero-elevation surface that extends continuously from the leading platform edge via the inter-airfoil strip to the trailing platform edge and, in the axial primary flow direction, in particular between the elevation and the second depression.

BRIEF DESCRIPTION OF THE DRAWINGS

Preferred exemplary embodiments of the present invention will be described in more detail below with reference to the drawings. It is understood that individual elements and components may be combined in other ways than those described. Corresponding elements are identified by the same reference characters throughout the figures and are not necessarily described again for each figure.

In the schematic drawings.

DETAILED DESCRIPTION

Figure 1:
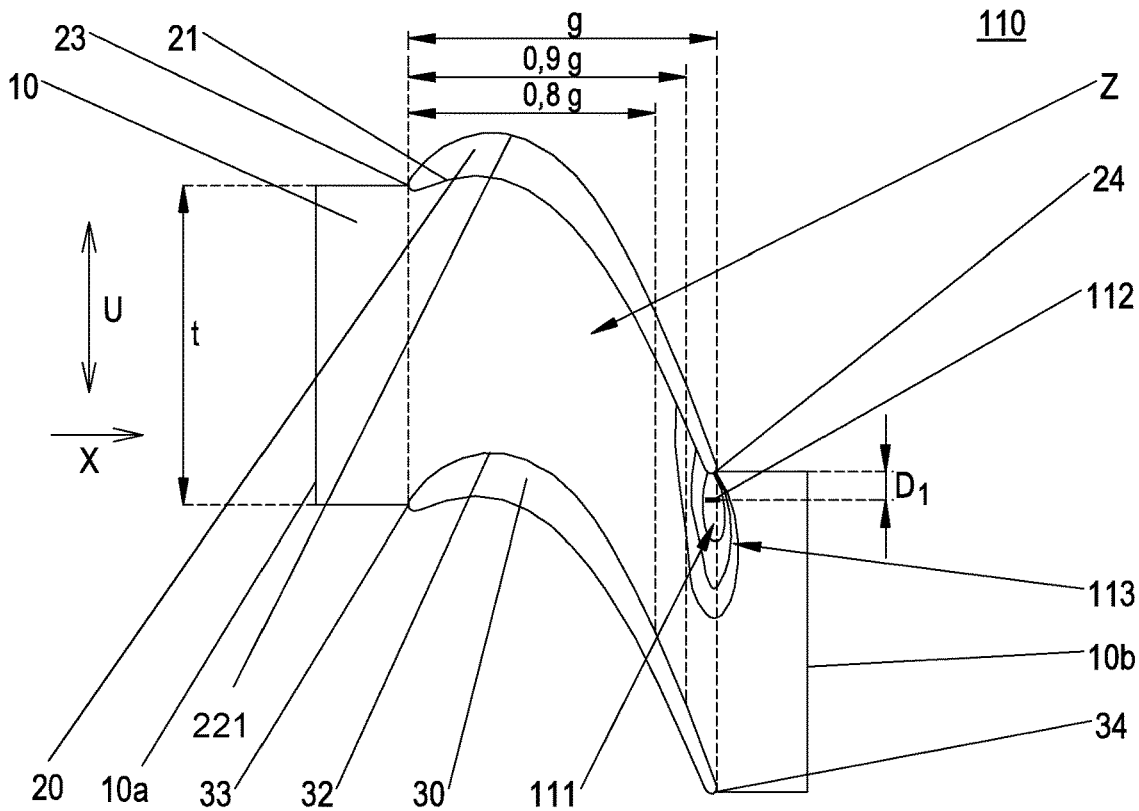
FIG. 1 is a plan view of an airfoil array segment according to a first exemplary embodiment of the present invention.

FIG. 1 shows in a schematic developed plan view (looking in a radial direction) an exemplary embodiment of an airfoil array segment 10 according to the present invention. Airfoil array segment 10 includes two adjacent airfoils 20, 30 which each have a pressure side and a suction side, as well as an inventive platform 10 having a leading platform edge 10a and a trailing platform edge 10b (viewed relative to the designated axial primary flow direction X). The platform may be a single piece or include, for example, two parts. In particular, it may include two parts that each have a respective one of airfoils 20, 30 extending therefrom.

An inter-airfoil strip Z extends in circumferential direction U from pressure side 21 of a first airfoil 20 to suction side 32 of second airfoil 30. In axial direction X, inter-airfoil strip Z is bounded at the upstream end by a connection between the leading edges 23, 33 of airfoils 20, 30 and at the downstream end by a connection between the respective trailing edges 24, 34. These connections extend at the platform surface only in the circumferential direction (i.e., without deviating axially therefrom) and are spaced apart by a distance g equal to the axial chord g of the inter-airfoil strip. A pitch spacing t is defined as the distance between leading edges 23, 33 at the platform surface.

The platform surface has a depression 111 (illustrated in FIG. 1 by elevation contour lines) having a lowest point 112. As can be seen from the elevation contour lines and the dashed marker lines, depression 111 extends less than 20% of axial chord g upstream of trailing edges 24, 34 of airfoils 20, 30 in a region opposite to the designated primary flow direction, and thus, depression 111 is located entirely downstream of 80% of axial chord g downstream of leading edges 23, 33. In the example shown, a lowest point 112 is located substantially on a downstream boundary of inter-airfoil strip Z, and thus in particular further than 90% of the axial chord downstream of leading edges 23, 33 of airfoils 20, 30. In the case of the airfoil array segment 110 shown in FIG. 1, depression 111 is spaced in circumferential direction U from pressure side 21 of first airfoil 20 by a distance $D_1$, where $D_1 \leq t/10$. Thus, in this specific embodiment, the distance is no more than 10% of pitch spacing t.

Downstream of 80% of axial chord g downstream of leading edges 23, 33, depression 111 extends up to suction side 221 of first airfoil 20; i.e., contacts suction side 221 in a contact region located in the downstream-most fifth of the inter-airfoil region. A portion of first airfoil 20 located in the region of trailing edge 24 is rooted on its suction side 221 even in depression 111. Starting at trailing edges 24, 34, depression 111 contacts pressure side 21 of the first airfoil in a direction opposite to the designated primary flow direction X no more than up to the upstream boundary of the downstream-most fifth of the inter-airfoil strip, and thus not beyond this boundary, but only in the aforementioned fifth of the inter-airfoil strip. In the figure, the aforementioned boundary is indicated by a dashed line and extends at 0.8 g downstream of the leading edges only the circumferential direction.

Depression 111 has a region 113 located downstream of trailing edges 24, 34 of the airfoils.

Figure 2:
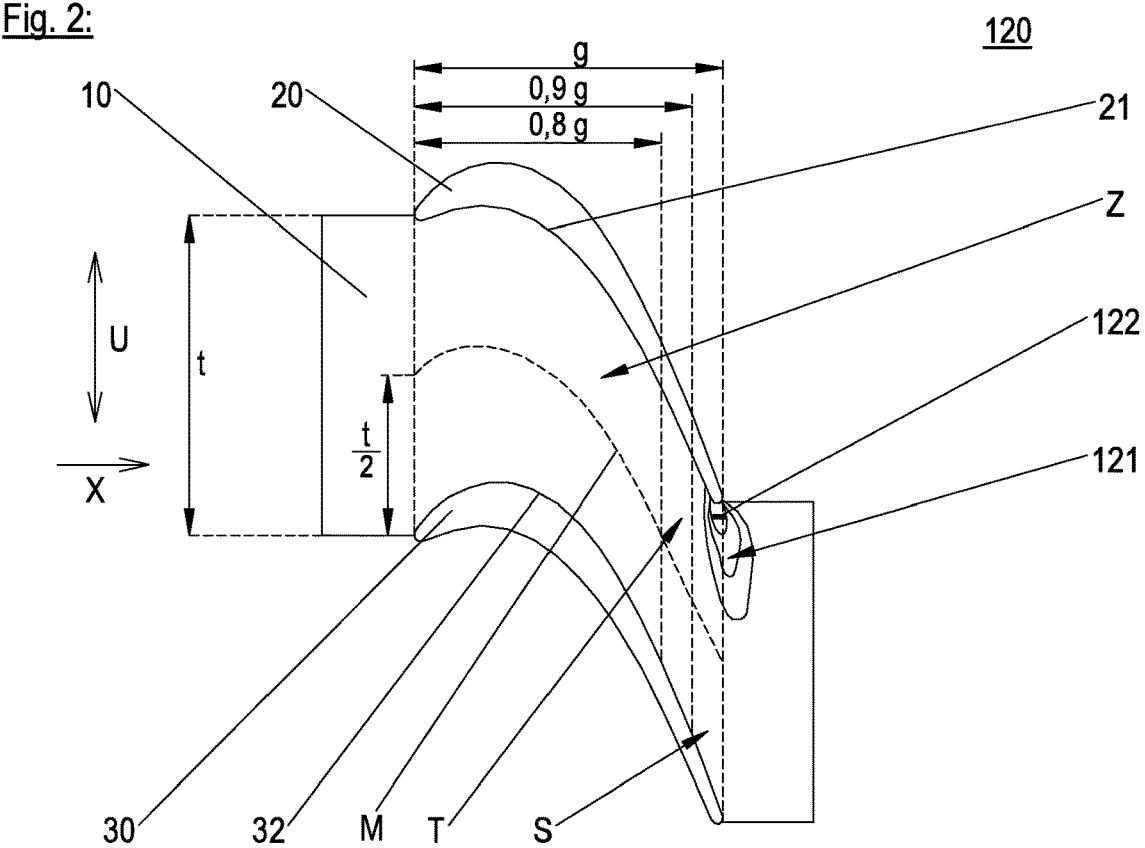
FIG. 2 is a plan view of an airfoil array segment according to a second exemplary embodiment of the present invention.

FIG. 2 schematically shows (also in a plan view looking in a radial direction) an inventive airfoil array segment 120 having a depression 121. In this example, depression 121 extends less than 10% of axial chord g upstream of trailing edges 24, 34. A zero-elevation surface including a sub-strip T of inter-airfoil strip Z is located upstream of depression 121. The upstream and downstream boundaries of this zero-elevation surface are indicated in the figure by dashed lines extending at 80%, respectively 90%, of axial chord g downstream of leading edges 23, 33 of the airfoils in the circumferential direction (without deviating axially therefrom) from the first airfoil to the second airfoil. Thus, in axial primary flow direction X, sub-strip T has a continuous width of 10% of axial chord g.

In the circumferential direction, depression 121 extends less than 50% of pitch spacing t. In particular, the platform surface of airfoil array segment 120 has a zero-elevation surface including a strip section S that is located between depression 121 and the second airfoil and extends in the downstream-most tenth of the inter-airfoil strip in circumferential direction U from suction side 32 of second airfoil 30 up to mid-pitch M, all points of which are spaced the same distance from pressure side 21 of the first airfoil and suction side 32 of the second airfoil, measured in circumferential direction U.

In the exemplary embodiment shown, a distance of lowest point 122 from the pressure side of the first airfoil measured in the circumferential direction is no more than 5% of pitch spacing t. In particular, first airfoil 20 may be rooted at its trailing edge 24 in lowest point 122; i.e., rise from this point.

Figure 3:
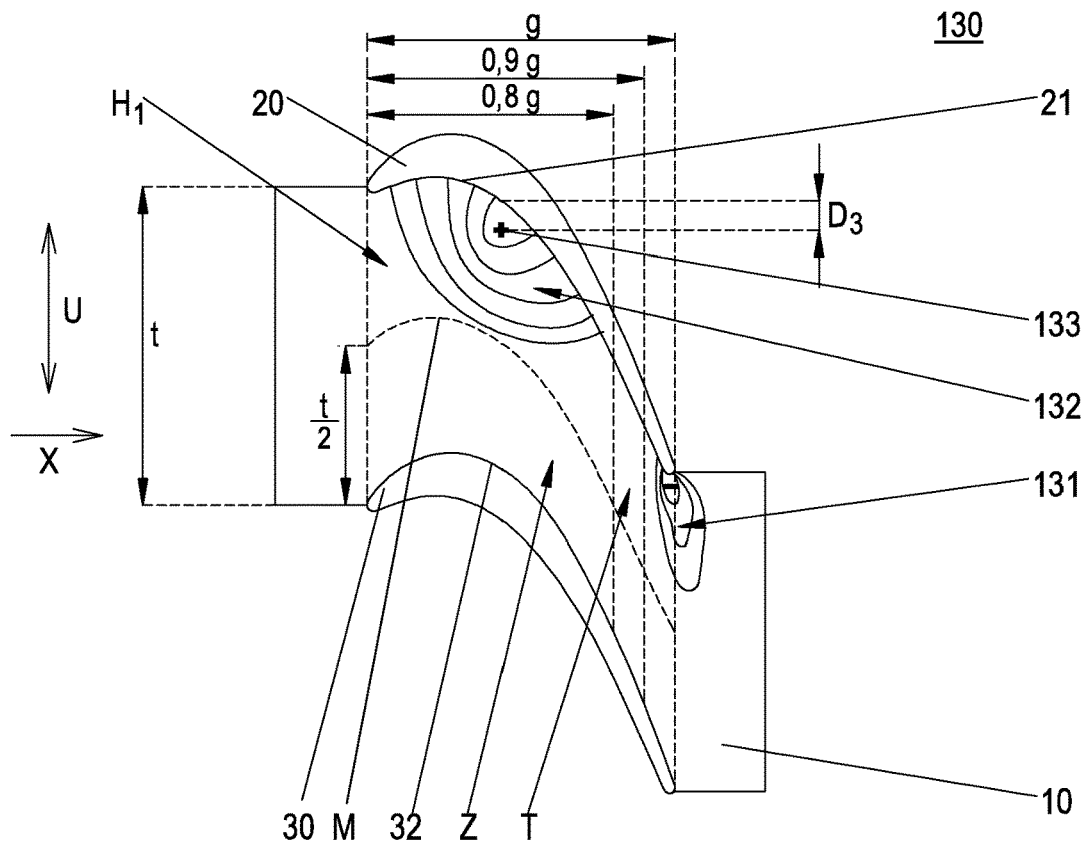
FIG. 3 is a plan view of an airfoil array segment according to a third exemplary variant embodiment of the present invention.

FIG. 3 shows an exemplary embodiment of an inventive airfoil array segment 130 where platform 10 has an elevation 132 in addition to a depression 131. Here, depression 131 is configured as in the example shown in FIG. 2 and therefore is not described in detail again; it being understood that the platform surface of an inventive airfoil array segment may also have an elevation and a depression such as the one shown in FIG. 1, for example.

Elevation 132 is located entirely upstream of depression 131 and, in the example shown, more particularly in a half $H_1$ of inter-airfoil strip Z which is located at pressure side 21 of first airfoil 20 (i.e., which is bounded in the circumferential direction by mid-pitch M).

In a portion upstream of depression 131, a first airfoil 20 is rooted (on its pressure side) to elevation 132; i.e., a boundary line between first airfoil 20 and the platform surface runs over elevation 132 and extends into depression 131.

A highest point 133 of elevation 132 is spaced from pressure side 21 of the first airfoil by a distance $D_3$ measured in the circumferential direction; where, preferably, $D_3 \leq t/5$ or even $D_3 \leq t/10$. In axial primary flow direction X, highest point 133 lies in a central region of elevation 132, and, more specifically, in a region between 35% and 65% of axial chord g downstream of leading edges 24, 34 of the airfoils.

Upstream of depression 131 and downstream of elevation 132, there is located a zero-elevation surface which includes a sub-strip T of inter-airfoil strip Z, which is defined as in FIG. 2. In particular, the upstream and downstream boundaries of this zero-elevation surface are indicated in the figure by dashed lines extending at 80%, respectively 90%, of axial chord g downstream of leading edges 23, 33 of the airfoils in the circumferential direction (without deviating axially therefrom) from the first airfoil to the second airfoil.

Figure 4:
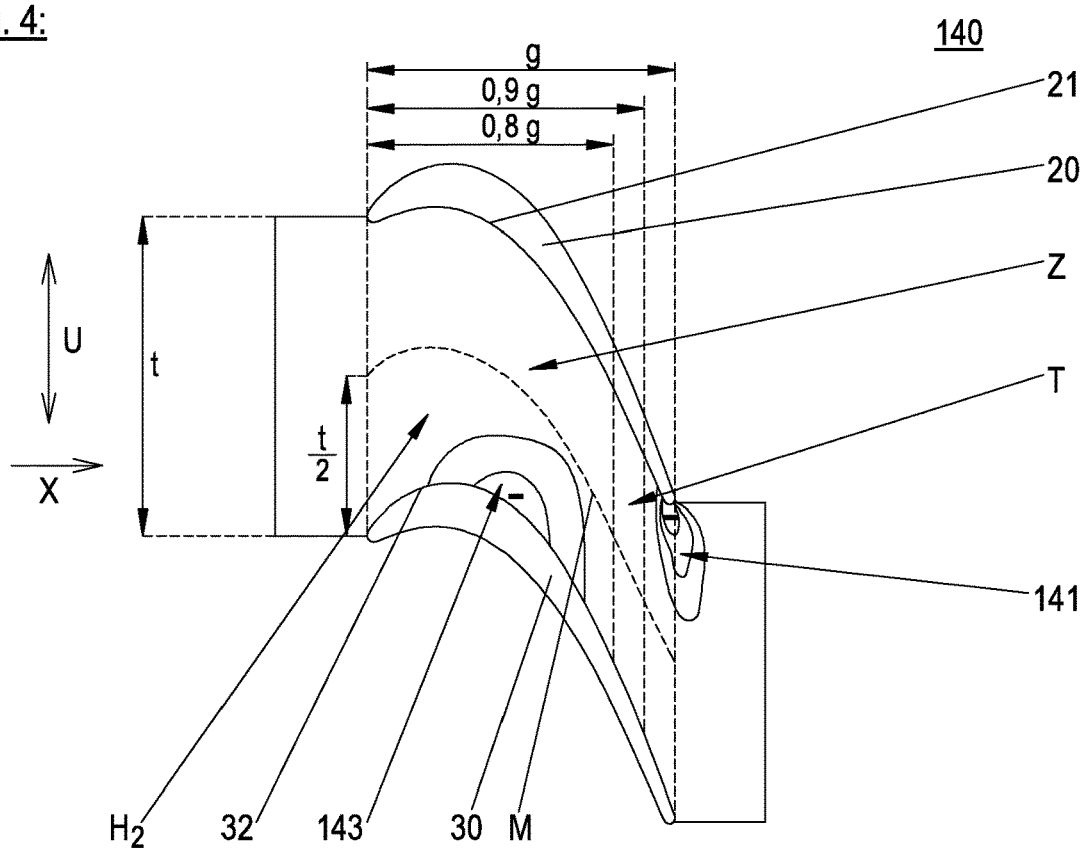
FIG. 4 is a plan view of an airfoil array segment according to a fourth exemplary variant embodiment of the present invention.

FIG. 4 shows a variant of an inventive airfoil array segment 140 where the platform surface has a first depression 141 as well as a second depression 143. Here again, depression 141 is configured as in the example shown in FIG. 2 and therefore is not described in detail again; it being understood that the platform surface of an inventive airfoil array segment may also have a second depression and another depression such as the one shown in FIG. 1, for example.

The second depression is located in a half $H_2$ of inter-airfoil strip Z which this located at suction side 32 of the second airfoil (i.e., which is bounded in the circumferential direction by a mid-pitch M). In a section of inter-airfoil strip Z (located centrally viewed relative to the axial primary flow direction), second airfoil 30 is rooted (on its suction side) partially in second depression 143.

A sub-strip T of the inter-airfoil strip, which is defined as above with reference to FIGS. 2 and 3 and extends between 80% and 90%, of axial chord g downstream of leading edges 23, 33 in the circumferential direction, extends between first depression 141 and second depression 143 and forms part of a zero-elevation surface of the platform surface. Viewed in axial primary flow direction X, a lowest point of second depression 143 is located in a central region of second depression 143.

Figure 5:
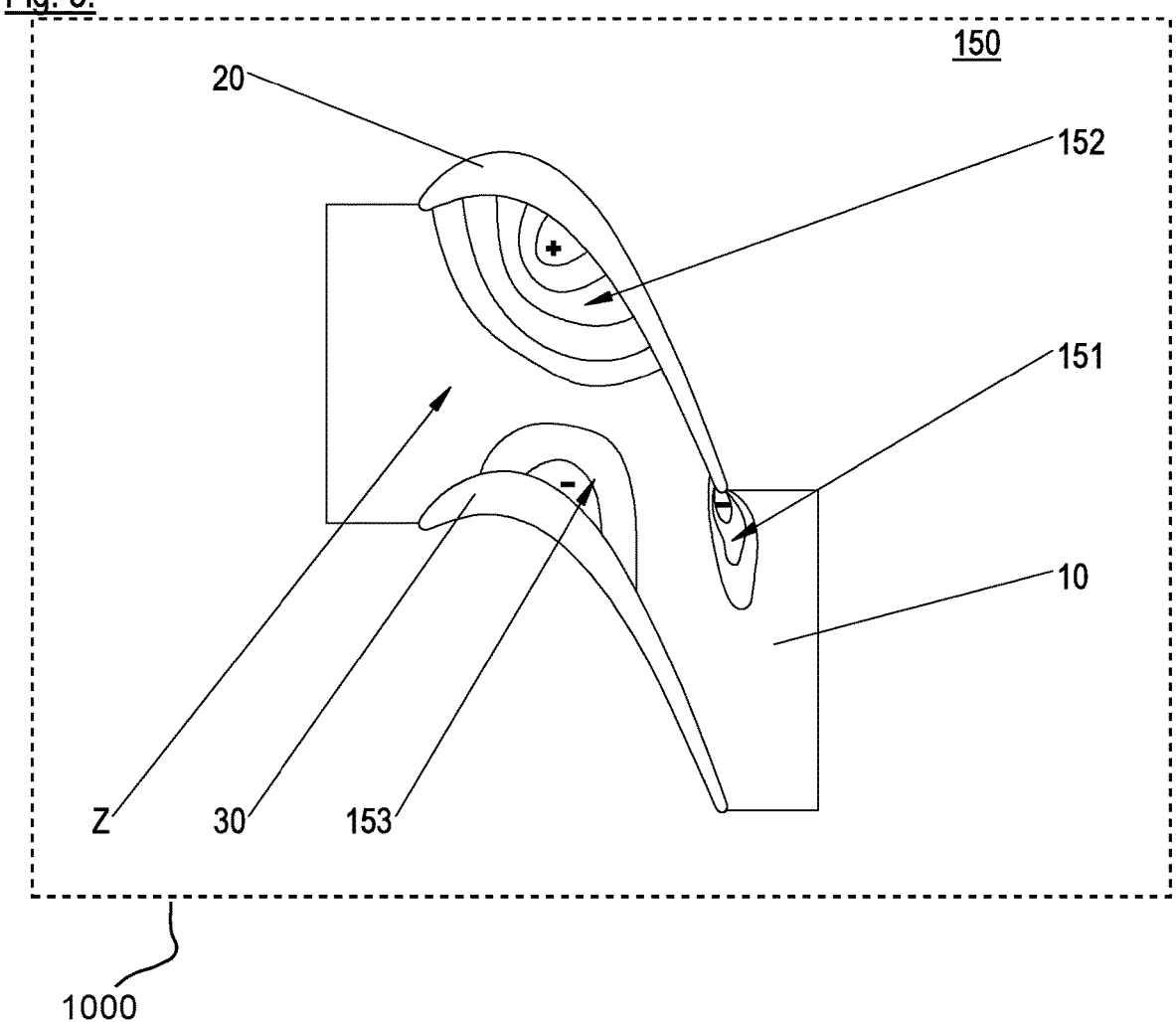
FIG. 5 is a plan view of an airfoil array segment according to a fifth exemplary variant embodiment of the present invention.

FIG. 5 shows another exemplary embodiment of an inventive airfoil array segment 150. This inventive airfoil array segment 150 has a first depression 151, a second depression 153 and an elevation 152 which, in the example shown, are configured in a manner analogous to the exemplary embodiments shown in FIGS. 3 and 4, respectively. Therefore, the specific properties of the depressions and the elevation are the same as those described above; the (dashed) reference lines relating to the dimensions are omitted in FIG. 5. In airfoil array segment 150, second depression 153 is located approximately opposite elevation 152 in the circumferential direction. Again, it is understood that the figure shows merely exemplary configurations of the depressions and the elevation.

Disclosed is an airfoil array segment 110, 120, 130, 140, 150 of an airfoil array for a turbomachine, airfoil array segment including a platform 10 having a platform surface, as well as at least two airfoils 20, 30. The platform surface has a depression 111, 121, 131, 141, 151 which extends up to the first airfoil and contacts pressure side 21 of the first airfoil downstream of 80% of axial chord g downstream of leading edges 23, 33 and which contacts pressure side 21 of the first airfoil downstream up to no more than 80% of axial chord g downstream of leading edges 23, 33. At least one lowest point 112, 122 of the depression is located at least 90% of axial chord g downstream of leading edges 23, 33.

Also disclosed are an airfoil array, an airfoil passage, a platform, a turbomachine, and an aircraft engine 1000 (indicated schematically in FIG. 5) being the turbomachine.

LIST OF REFERENCE CHARACTERS 110, 120, 130, 140, 150 airfoil array segment
10 platform
10a leading platform edge
10b trailing platform edge
20, 30 airfoil
21 pressure side of first airfoil 20
23, 33 leading edge
24, 34 trailing edge
32 suction side of second airfoil 30
111, 121, 131, 141, 143, 151, 153 depression
112, 122, 142 lowest point of the depression
113 region of depression 111 downstream of the trailing edges
132, 152 elevation
133 highest point of the elevation
1000 aircraft engine, turbomachine
g axial chord
t pitch spacing
$D_1$ distance of lowest point 122 from the pressure side of the first airfoil measured in the circumferential direction
$D_3$ distance of highest point 133 from the pressure side of the first airfoil measured in the circumferential direction
$H_1$ half of inter-airfoil strip Z that is located at the pressure side of the first airfoil
$H_2$ half of inter-airfoil strip Z that is located at the suction side of the second airfoil
M mid-pitch
S strip section of the inter-airfoil strip
T sub-strip of the inter-airfoil strip
U circumferential direction
X designated axial primary flow direction
Z inter-airfoil strip

What is claimed is:

1. An airfoil array segment of an airfoil array for a turbomachine, the airfoil array segment comprising:
a platform having a platform surface, a first airfoil and a second airfoil, the first and second airfoil defining, on the platform surface, axial chords of the first airfoil and the second airfoil between respective leading and trailing edges, and defining an inter-airfoil strip between the pressure side of the first airfoil and the suction side of the second airfoil;
wherein the platform surface has a depression extending up to the first airfoil, the depression having at least one lowest point located at least 90% of the axial chord of the first airfoil downstream of the leading edges, and the depression contacting the pressure side of the first airfoil downstream of 80% of the axial chord of the first airfoil downstream of the leading edges and contacting the pressure side of the first airfoil downstream up to no more than 80% of the axial chord of the first airfoil downstream of the leading edges.

2. The airfoil array segment as recited in claim 1 wherein the depression is located entirely downstream of 80% of the axial chord of the first airfoil downstream of the leading edges.

3. The airfoil array segment as recited in claim 1 wherein a portion of the first airfoil is rooted on its suction side in the depression.

4. The airfoil array segment as recited in claim 1 wherein the depression has a region located downstream of the trailing edges of the first and second airfoils.

5. The airfoil array segment as recited in claim 1 wherein the depression extends from the pressure side of the first airfoil toward the suction side of the second airfoil.

6. The airfoil array segment as recited in claim 5 wherein the depression extends no more than 60% or no more than 50% of a pitch spacing of the airfoil array segment in the circumferential direction.

7. The airfoil array segment as recited in claim 1 wherein the platform surface has at least one elevation entirely or partially located upstream of the depression.

8. The airfoil array segment as recited in claim 7 wherein a portion of the first airfoil is rooted on its pressure side to the elevation.

9. The airfoil array segment as recited in claim 1 wherein the depression is a first depression and the platform surface has at least one second depression entirely or partially located upstream of the first depression.

10. The airfoil array segment as recited in claim 9 wherein a portion of the second airfoil is rooted on its suction side in the second depression.

11. An airfoil array for a turbomachine, the airfoil array comprising at least one airfoil array segment as recited in claim 1.

12. An airfoil passage of a turbomachine, comprising the airfoil array segment as recited in claim 1 and an endwall located opposite the platform of the airfoil array segment, the airfoil passage being bounded by the airfoil array segment and and by the endwall.

13. A platform for an airfoil array segment as recited in claim 1 wherein the platform is adapted to adjoin the first and second airfoils in the circumferential direction.

14. A turbomachine comprising at least one airfoil array as recited in claim 11.

15. An aircraft engine comprising the turbomachine as recited in claim 13.

* * * * *